United States Patent [19]
Hancy

[11] 3,869,813
[45] Mar. 11, 1975

[54] TEACHING DEVICE FOR FORMING INTELLIGENCE CHARACTERS

[76] Inventor: Raymond E. Hancy, 6515 E. Vancey Dr., Brook Park, Ohio 44142

[22] Filed: Oct. 10, 1973

[21] Appl. No.: 404,860

[52] U.S. Cl. .................................................. 35/37
[51] Int. Cl. .......................................... G09b 11/04
[58] Field of Search ........ 35/37, 36, 38, 35 A, 22 R

[56] References Cited
UNITED STATES PATENTS

| | | | |
|---|---|---|---|
| 1,103,369 | 7/1914 | Montessori | 35/36 UX |
| 3,197,892 | 8/1965 | Hancy | 35/37 |
| 3,314,171 | 4/1967 | Bethune | 35/37 |
| 3,363,339 | 1/1968 | Place | 35/38 |
| 3,774,319 | 11/1973 | Sprowls | 35/37 |

*Primary Examiner*—Wm. H. Grieb
*Attorney, Agent, or Firm*—McNenny, Farrington, Pearne & Gordon

[57] ABSTRACT

There is provided an improved structure for teaching the formation of intelligence characters. A planar card is provided including a visible representation of a character formed of at least one stroke element and a plurality of individually inclined finger slides projecting out of the plane of the card for encouraging movement of the finger in a desired direction along the stroke path of the element.

12 Claims, 14 Drawing Figures

PATENTED MAR 11 1975

TEACHING DEVICE FOR FORMING INTELLIGENCE CHARACTERS

BACKGROUND OF THE INVENTION AND PRIOR ART

This invention relates as indicated to a teaching device to aid in teaching the formation of intelligence characters such as the alphabet and numerals. In my previous U.S. Pat. No. 3,197,892 dated Aug. 3, 1965, I have provided a structure especially adapted for use with a writing instrument such as a pencil and which is characterized by a series of serrations which enable movement of the writing instrument in one direction and resist movement in the opposite direction. These serrations are also recessed relative to the plane of the top surface to prevent deviation from the line of a given stroke. Thus, the student learns the proper direction of a stroke in forming an intelligence character and its geometric configuration. In use, the writing instrument is first traced over the stroke element in the proper direction and confined from lateral deviation by the edges of the recess, and the student then seeks to reproduce what he has traced on a plain sheet of paper.

Another such device is shown in the U.S. Pat. to Bethune No. 3,314,171 which also includes recesses and seeks also to impart knowledge of the "air strokes" to be experienced by the student in forming a given letter.

The present invention contemplates a different form of teaching device and is distinguished from prior art devices in several respects including most notably the fact that no lateral restraint is imposed to prevent deviation from a predetermined stroke path. The major part, and preferably all, of the surface area of the finger slide members lies above the plane of the card on which the character is placed.

The alphabet of the present invention contains, therefore, the essential structure necessary to convey the expression of innate sensory response into the more complex perspective movements required of reading and writing. It is necessary that this approach be thought of as a bridge between the void of unorganized sensory data and the direction of organized thought process. The goal is then to utilize the sensory mechanisms in such a manner as to induce insight in the problem-solving situation. Further development is then predicted upon proper structuring of the acquired knowledge and skills until the student no longer relies upon the sensory factors for information. The student is then responding to an automatic learned response through which fluency and movement are an asset to the functional goals.

The object of superimposing raised directional finger slides over letters and numbers is to provide the student with a tool designed to create insight into line forms and the structural relationships of those line forms. The raised finger slides accomplish this by stimulating sensory responses that transmit a directional movement to the learner.

The correct movements are achieved through perceptual insight that ultimately produces the desired response in the learner. Thus, when error occurs, the learner loses contact with the line and its directional movement. By his action and his choice, the learner may discriminate and evaluate reasonable alternatives. To correct the error, the student must choose to return to the line form.

BRIEF STATEMENT OF THE INVENTION

Briefly stated, the present invention is in the provision of a device for teaching the formation of intelligence characters. This device comprises a planar card desirably formed of a relatively stiff plastic sheeting material and including a visible representation of a character formed of at least one stroke element. A plurality of individual inclined plane finger slides are provided at least a major portion of the surface of which projects above the plane of the card and which finger slides lie along a predetermined stroke used in forming the character. The finger slides are configured to encourage movement of the finger in a desired direction or in some cases directions along the stroke element. Where straight line stroke elements are involved, means may be conveniently provided which project above the plane of the card at the desired beginning of the stroke and which serve to guide the finger in the proper direction toward the succeeding finger slides. In more specific embodiments, stop means may be provided for interrupting or resisting finger movement at the end of a stroke element. In the cases of intelligence characters which may require retracing of at least a portion of a stroke element such as in the capital letter B or the numeral three as frequently formed, the finger slides are so configured as to be bidirectional and to permit ready movement of the finger in a retracing operation. In still more specific embodiments where curved stroke elements are encountered, the finger slides are conveniently inclined in a transverse direction toward the center of the curve.

DETAILED DESCRIPTION OF THE DRAWINGS

Figure 4:
FIG. 4 is a fragmentary cross-sectional view of the device shown in FIG. 1 as it appears in the plane indicated by the line 4—4.
Figure 3:
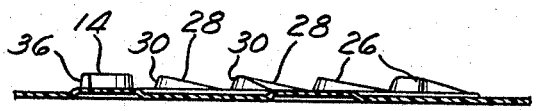
FIG. 3 is a partial cross section and partial elevation of the device as shown in FIG. 1 as it appears in the plane indicated by the line 3—3.

Referring now more particularly to FIGS. 1–4 inclusive, there is here shown for illustrative purposes the capital letter R. In the manner in which it is desired to be taught, the capital letter R depicted on a card 8 is formed from a downward straight line stroke element 10 slightly raised above the plane of the card 8 as the first element which is formed. The number of the stroke is conveniently indicated by a triangular shaped mark 12 of contrasting color to the stroke element, for example a yellow triangle 12 on a black stroke element 10 with the apex thereof pointed in the direction desired to be traced. The stroke element 10 is provided with a plurality of inclined plane finger slides 14 projecting above the plane of the card 8 and disposed along the stroke element 10 at regularly spaced intervals. The inclination of the finger slides 14 is upwardly toward a crown 11 above the plane of the card 8. As best shown in FIG. 4, the inclined plane finger slides are provided with a relatively long ramp portion 16 and a relatively short abruptly declining cliff or return portion 18 returning to the plane of the stroke element. The surface of the ramp portions 16 may, if desired, be slightly dished or concave to better accommodate the contour of the tracing finger.

With the inclined plane finger slides 14 arranged as shown in the stroke element 10, movement of the finger in the direction indicated by the apex of the triangle 12 is quite easy and transmits through the finger of the student a feeling of ease of movement although interrupted by the noticeable effect of dropping to the plane of the stroke element 10 or the card 8 over the cliff portion 18. In order to indicate the end of a stroke, it is convenient to provide a finger stop 20. This is conveniently a member raised above the plane of the card 8 and configured to receive the finger of the student in such a way as to create a perception in the student that the tracing movement of the finger should be stopped at this point. To facilitate the learner in beginning a stroke, there is provided a projection 13 raised above the plane of the card for guiding the finger in the proper direction toward the finger slides.

The second stroke in the formation of the letter R is formed along the stroke element 22. Again, there are provided inclined plane finger slides 24 which lie along a straight portion, and curved inclined plane finger slides 26 which describe a semicircular arc and lead into a further straight portion moving in an opposite direction and comprised of finger slides 28. Finger slides 24, 26, and 28 are of generally the same construction as finger slides 14. The cliff portions 30 are in the same direction along the path which is to be followed by the finger in making the desired stroke. The beginning of the second stroke is indicated by a pair of contrastingly colored triangle members 32 and 34 in tandem relation with their apices pointed in the direction of the beginning of the stroke. To facilitate the learner in ending the stroke at the proper point, thereby defining stroke element 22, there is provided an abutment or stop 36 which is also raised above the plane of the card 8.

Figure 1:
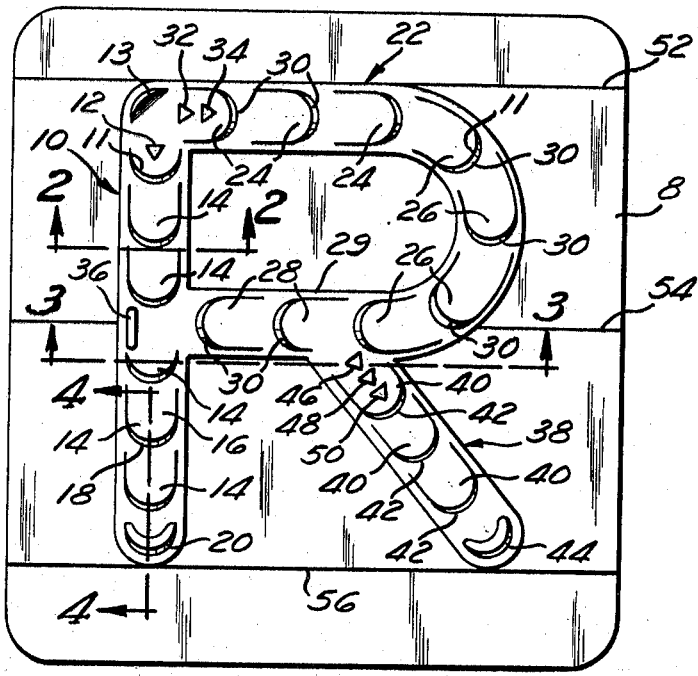
FIG. 1 illustrates the structure of a device for teaching the formation of the letter R.
Figure 2:
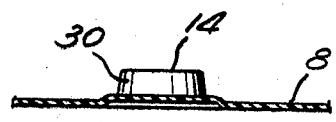
FIG. 2 is a cross-sectional view of a portion of the device shown in FIG. 1 as it appears in the plane indicated by the line 2—2.

The third stroke element 38 is again in a straight line at an angle originating in the third portion 29 of stroke element 22 and moving downwardly and to the right as shown in FIG. 1. Again, the stroke element 38 includes a series of inclined plane finger slides 40 of similar geometric configuration to the finger slides 14, 24, and 28. These are arranged with their cliff portions 42 so as to encourage movement in the direction downwardly and to the right and to resist movement of the finger upwardly and to the left. A stop 44 of similar construction to the stop 20 on stroke element 10 is also provided to indicate the termination of the stroke 38. Again, to indicate that the stroke 38 is the third stroke to be made, there are provided three contrastingly colored triangular members 46, 48, and 50 with their apices aligned and indicating a direction of movement downwardly and to the right. In order to aid in visual orientation of the letter with respect to guidelines, there may be printed on or applied to the surface of the card 8 guideline indicators 52, 54, and 56. To slightly differentiate the plane of the stroke elements 10, 22, and 38 from the plane of the card 8, they may desirably be raised a few thousandths of an inch out of the plane of the card, and the finger slides, e.g., slides 14, embossed therefrom. In FIGS. 1–4, the stroke elements 10, 22, and 38 are shown slightly raised. This aids in applying color to the stroke elements and also provides a noncompulsory physically detectable indication of the proper path.

It will be observed from FIGS. 1–4 inclusive that restraint against deviation of the finger from the stroke path is not provided and thus the student must consciously attend to maintaining his finger along the path in contradistinction to the structures of the prior art noted above. A conscious effort must be made to re-enter the path and to continue the stroke properly.

Figure 5:
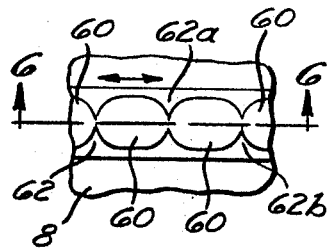
FIG. 5 is a top elevation of a portion of a device which must be retraced in forming the letter or character.
Figure 6:
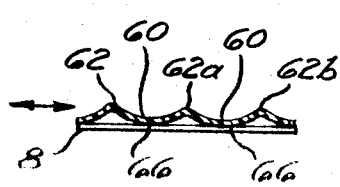
FIG. 6 is a cross-sectional view of the portion shown in FIG. 5 as it appears in the plane indicated by the line 6—6.

Referring now more particularly to FIGS. 5 and 6, there are certain occasions in the drafting of intelligence characters where a given stroke element must be retraced. To accommodate this event, the present invention provides for bidirectional inclined plane finger slides such as shown in FIGS. 5 and 6. There is here shown, for example, bi-directional finger slides 60 having at each end thereof a raised portion or crown 62. Instead of an abrupt cliff as shown in FIG. 4, the declining portion 64 moving off the crown 62 is smoothly sloped to a bottom portion 66 and then smoothly upwardly sloped to the next succeeding crown 62a. It will be seen that when the finger is moved either to the right or to the left, interference of the kind afforded by the cliffs 30 to reverse movement is not encountered. Thus, retracing of the same portion of a stroke element is readily accommodated.

Figure 7:
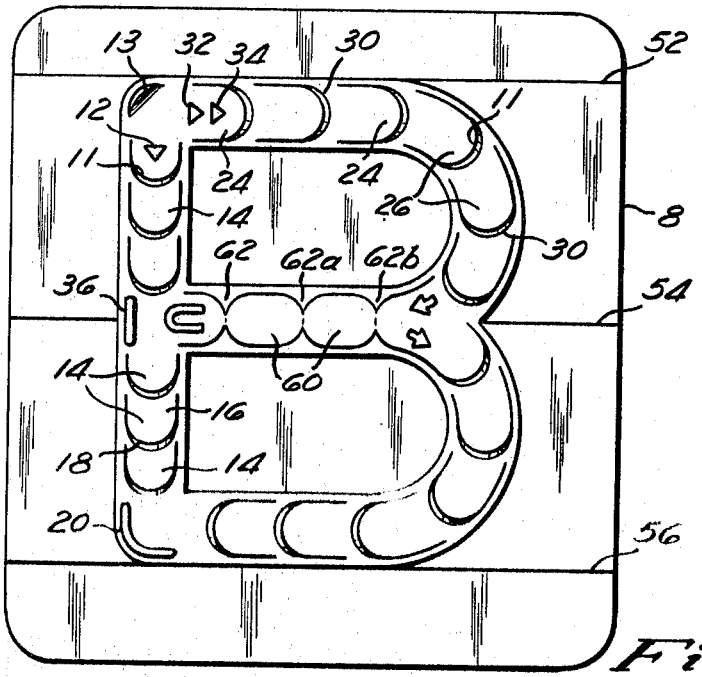
FIG. 7 illustrates the structure of a device for teaching the formation of the letter B.

FIG. 7 is a plan view of a device for teaching the formation of the letter B and embodying a retraceable portion such as shown in FIGS. 5 and 6. The numerals used in connection with the description of FIG. 1 are the same as those used in FIG. 7 where correspondence in shape and function is found. The letter B is one similar to the numeral 3 in requiring a retraced portion as above described. It is quite clear that other modifications of the script being taught may introduce variations from the very simple strokes illustrated in the annexed drawings. More complex figures may have more retraced portions, for example, than illustrated. Lower case script letters provide examples of outlines involving considerably more in the way of retraced portions. FIGS. 1–7, however, include basic stroke elements from which all letters, numerals and other characters may be formed.

Figure 8:
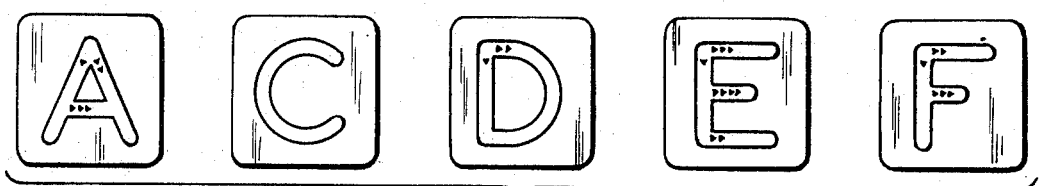
FIG. 8 is a plan view of cards depicting the invention with respect to the letters A, C, D, E, and F.
Figure 9:
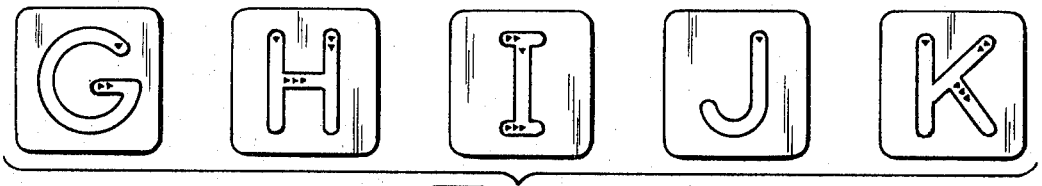
FIG. 9 is a plan view of cards depicting the invention with respect to the letters G, H, I, J, and K.
Figure 10:
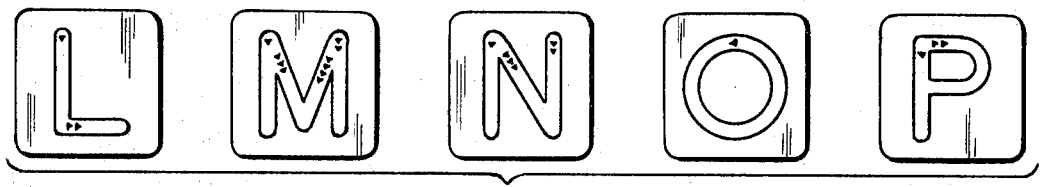
FIG. 10 is a plan view of cards depicting the invention with respect to the letters L, M, N, O, and P.
Figure 11:
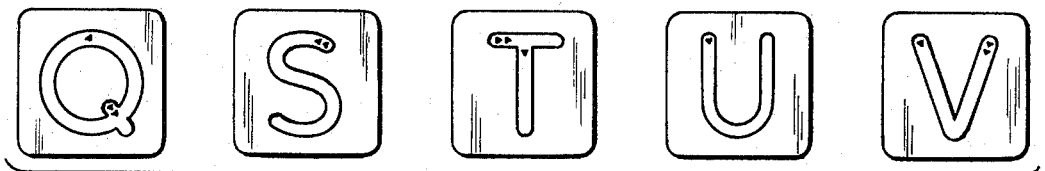
FIG. 11 is a plan view of cards depicting the invention with respect to the letters Q, S, T, U, and V.
Figure 12:
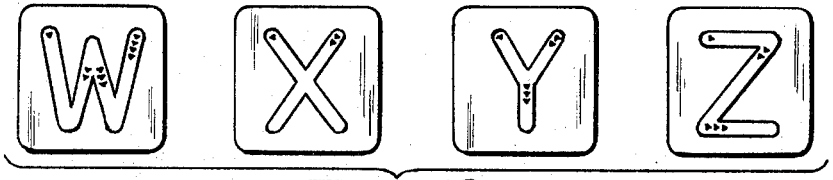
FIG. 12 is a plan view of cards depicting the invention with respect to the letters W, X, Y, and Z.
Figure 13:
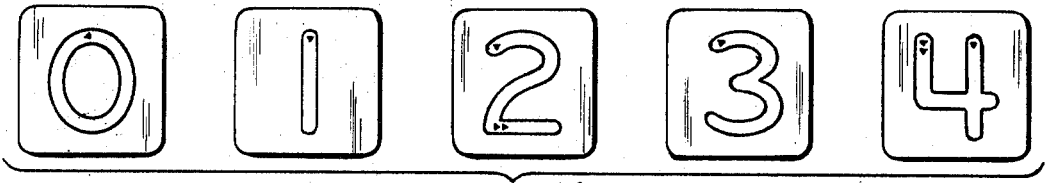
FIG. 13 is a plan view of cards depicting the invention with respect to the numerals 0, 1, 2, 3, and 4.
Figure 14:
FIG. 14 is a plan view of cards depicting the invention with respect to the numerals 5, 6, 7, 8, and 9.

FIG. 8 shows on a reduced scale cards as they might appear for the letters A–F, inclusive, and indicating the order of forming the strokes by the applied triangular indicia. The slides, stops and retraceable sections are not shown as these are merely repetitive of those already shown for the letters R and B. The finger slides are of the same construction as shown in FIGS. 1–7, and the stops at the end of the strokes are similar in construction to the stops 20, 44, and 36. FIGS. 9, 10, 11, 12, 13, and 14 show on a reduced scale the balance of the alphabet and numbers in the same manner as previously indicated. The inventive concept is present in connection with each of the letters as shown. By utilizing the sense of vision along with the sense of touch and the necessity for decision, the student achieves a better image of the character involved and the rules governing its formation to the ends that learning is facilitated and performance improved with respect to legibility and speed. While only block form letters of the Arabic system of representation have been shown, it will be understood that the principles of the present invention may be applied not only to individual characters but also to combinations of characters, e.g. the number 10 or the word "at", etc., as lower case arabic letters and to characters of orthographies of other languages.

What is claimed is:

1. A device for teaching the formation of intelligence characters comprising:
   a. a planar card including a visible representation of a character formed of at least one stroke element, and
   b. a plurality of individual inclined plane finger slides having a major portion of the surface thereof projecting above the plane of said card and lying along a predetermined stroke in forming said character and configured to encourage movement of the finger in a desired direction along said stroke element.

2. A device in accordance with claim 1 which is further characterized by means projecting above the plane of the card at the desired beginning of a stroke for guiding the finger in the proper direction toward said finger slides.

3. A device in accordance with claim 1 which is further characterized by stop means for resisting finger movement at the end of a stroke element.

4. A device in accordance with claim 1 wherein at least a portion of a stroke element includes finger slides which are easily retraced in the opposite direction.

5. A device in accordance with claim 1 wherein the finger slides are unidirectional.

6. A device in accordance with claim 1 wherein the finger slides include a relatively long inclined plane portion and an abrupt cliff portion.

7. A device in accordance with claim 6 wherein the cliff portions of succeeding finger slides are oriented in the same direction along the stroke element.

8. A device in accordance with claim 1 wherein at least one stroke element includes a curved portion.

9. A device in accordance with claim 8 wherein the finger slides on the curved portion of the stroke element are inclined in a transverse direction toward the interior of the curve.

10. A device in accordance with claim 1 wherein the stroke element is slightly raised out of the plane of the card and the finger slides project above the plane of said stroke element.

11. A device for teaching the formation of intelligence characters comprising:
   a. a planar card including a visible representation of a character formed of at least one stroke element;
   b. a plurality of individual inclined plane finger slides projecting above the plane of said card and lying along a predetermined stroke path in forming said character and configured to encourage movement of the finger in a desired direction along said stroke element;
   c. means projecting above the plane of the card at the desired beginning of a stroke for guiding the finger in the proper direction toward said finger slides; and
   d. stop means for resisting finger movement at the end of a stroke element.

12. A device in accordance with claim 11 wherein at least a portion of the stroke element includes bidirectional finger slides which are easily retraced in the opposite direction.

* * * * *